Feb. 10, 1953 E. C. SEWARD 2,627,959
MATERIAL HANDLING MECHANISM
Filed Feb. 28, 1951 5 Sheets-Sheet 1
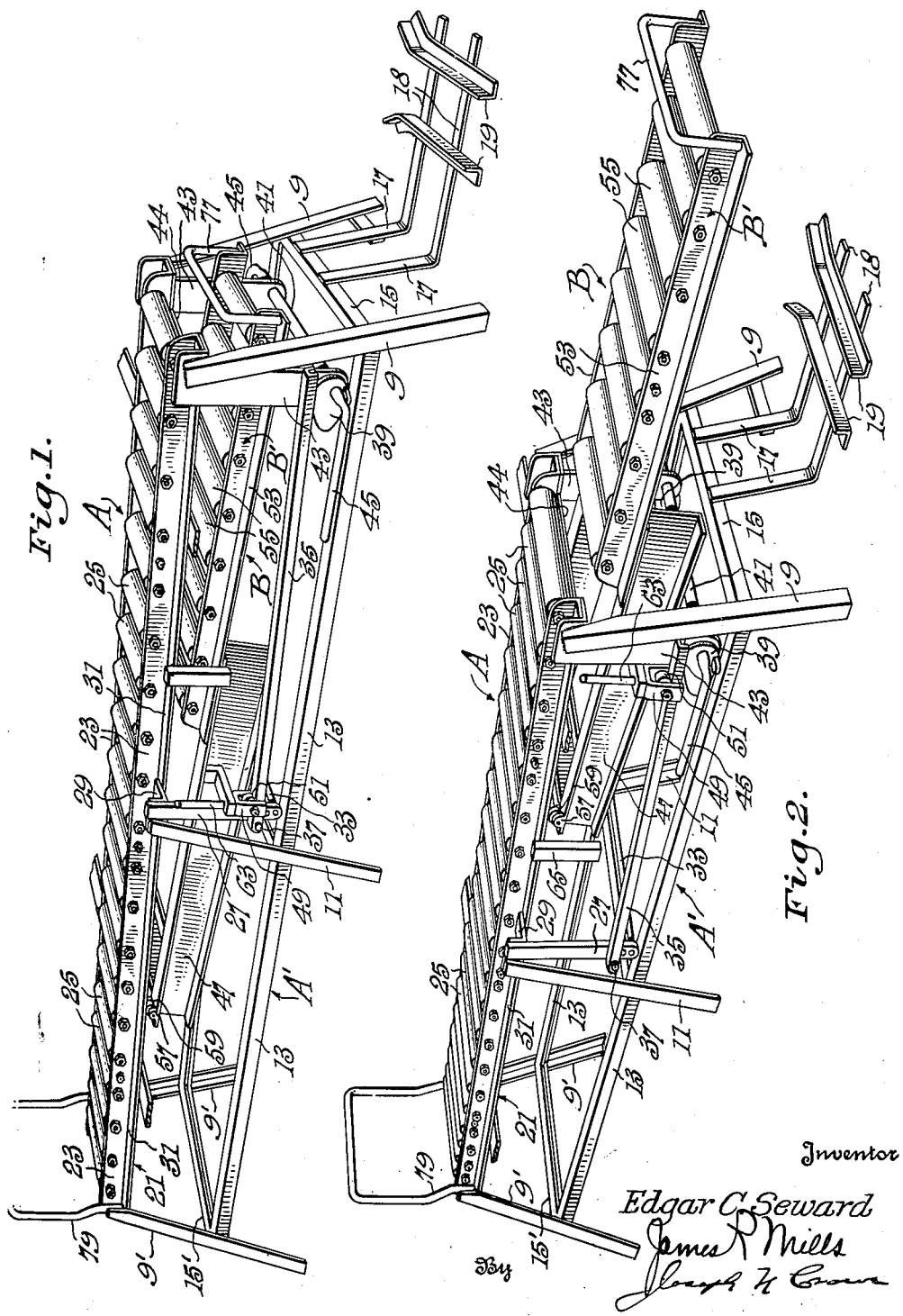
Inventor
Edgar C. Seward
By James R. Mills
Joseph H. Cr...
ATTORNEYS Feb. 10, 1953      E. C. SEWARD      2,627,959
MATERIAL HANDLING MECHANISM
Filed Feb. 28, 1951      5 Sheets-Sheet 3
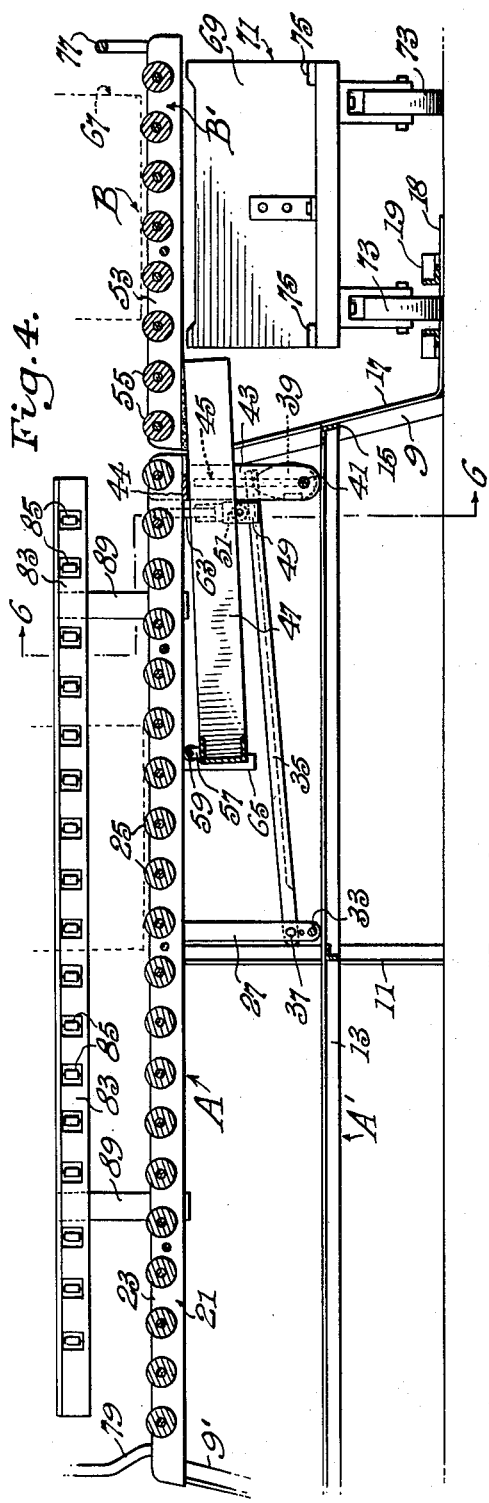
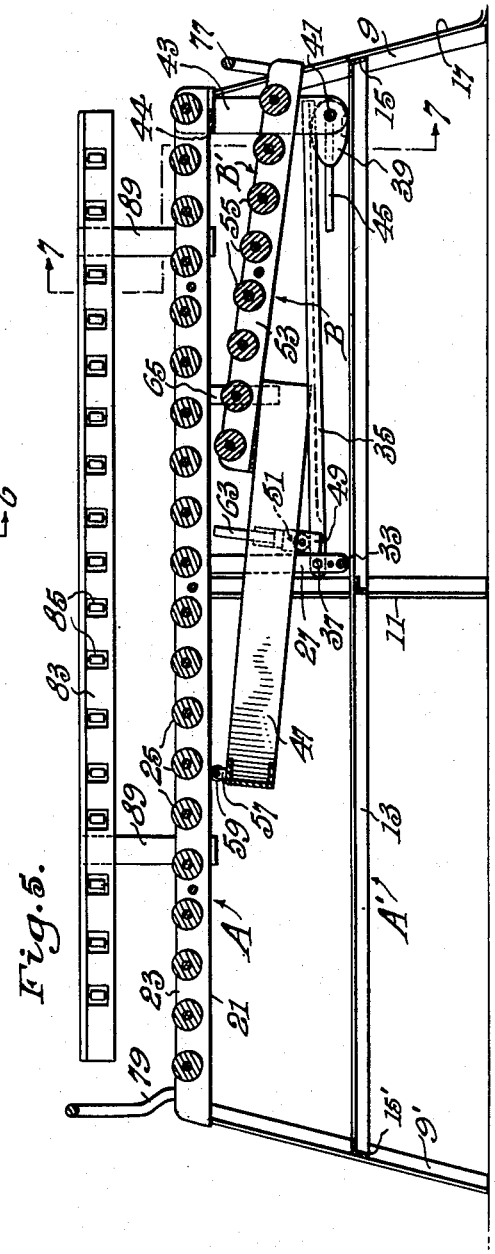
Inventor
Edgar C. Seward
By James P. Mills
ATTORNEYS

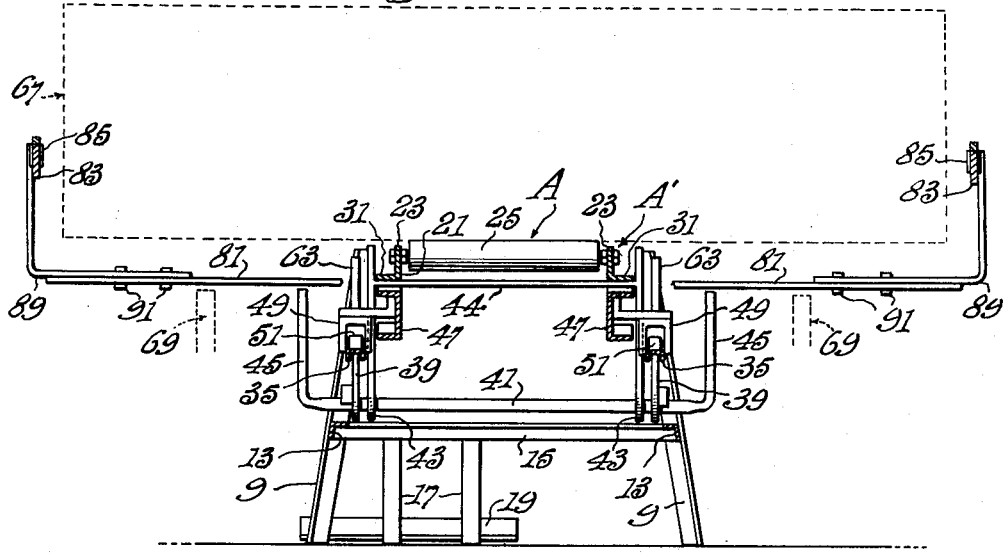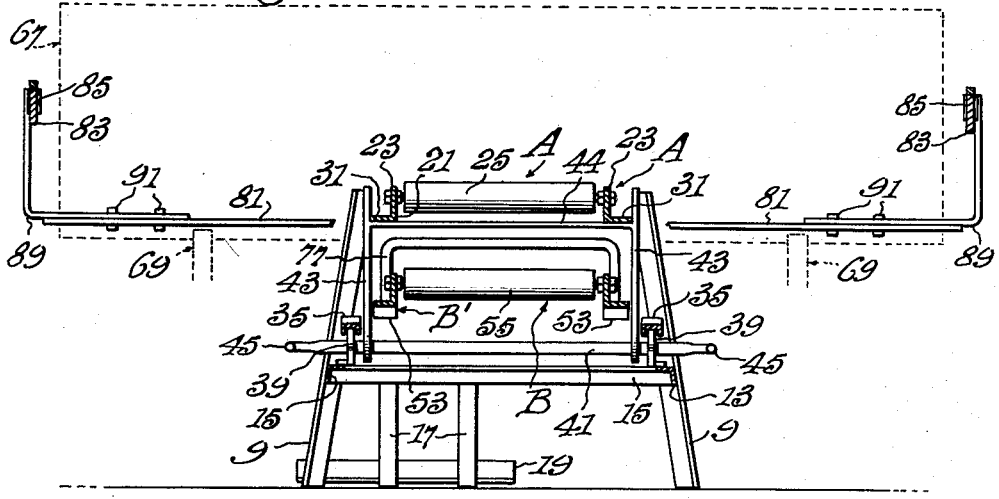

Feb. 10, 1953 E. C. SEWARD 2,627,959
MATERIAL HANDLING MECHANISM
Filed Feb. 28, 1951 5 Sheets-Sheet 5

Inventor
Edgar C. Seward
By James P. Mills
ATTORNEYS

Patented Feb. 10, 1953

2,627,959

UNITED STATES PATENT OFFICE 2,627,959

MATERIAL HANDLING MECHANISM

Edgar Carl Seward, Alexandria, Va.

Application February 28, 1951, Serial No. 213,188

5 Claims. (Cl. 193—35)

(Granted under Title 35, U. S. Code (1952), sec. 266)

The invention described herein may be manufactured and used by or for the Government for governmental purposes, without payment to me of any royalty thereon.

The present invention provides improvements in material handling devices that may be employed advantageously in the handling of freight cargoes for rapidly clearing piers, freight terminals and the like, of freight cargoes being unloaded from ships, cars, truck, and similar transporting equipment.

More particularly, the invention relates to a roller conveyor adapted to receive heavy and awkward items of cargo directly from ship side, or other transporting equipment, and to convey such items directly onto dock trailers or the like without requiring manual or mechanical handling between the unloading of the items of cargo and the removal thereof from the trailers at a depot for storage or distribution.

Still more particularly, the present invention provides an improved conveyor construction which includes adjustable sections, one of the sections being telescopically mounted relative to an adjacent section, and which may be raised and lowered vertically relatively to the said adjacent section so as to present a flush conveyor surface therewith when in raised position, and which may be shifted from an extended position relative to the said adjacent section to a retracted position beneath the said adjacent section when in lowered position, thereby affording economies as to space for storage, and also provides means for readily clearing the conveyor from a loaded dock trailer or other vehicle without disturbance of the cargo or shifting of the trailer or vehicle until ready for transport to the cargo depot. When in extended and raised position, there is present a continuously even conveyor surface throughout the entire length of the conveyor.

The invention will be understood more readily from a consideration of the accompanying drawings in which:

Fig. 1 is a perspective view of an improved roller conveyor construction embodying the features of the present invention, the view showing the conveyor with its adjustable section retracted in storage position;

Fig. 2 is a perspective view of the conveyor of Fig. 1 with the adjustable section extended but still in lowered position;

Fig. 4 is a vertical longitudinal sectional view of the conveyor as shown in Fig. 3 but showing a dock trailer or equivalent vehicle in cargo-receiving position relative to the conveyor, the view being taken along the longitudinal center line of the conveyor in the position shown in Fig. 3;

Fig. 5 is a similar view taken along the center line of Fig. 1, the view showing in detail the arrangement of the parts when in the position of Fig. 1;

Figure 3:
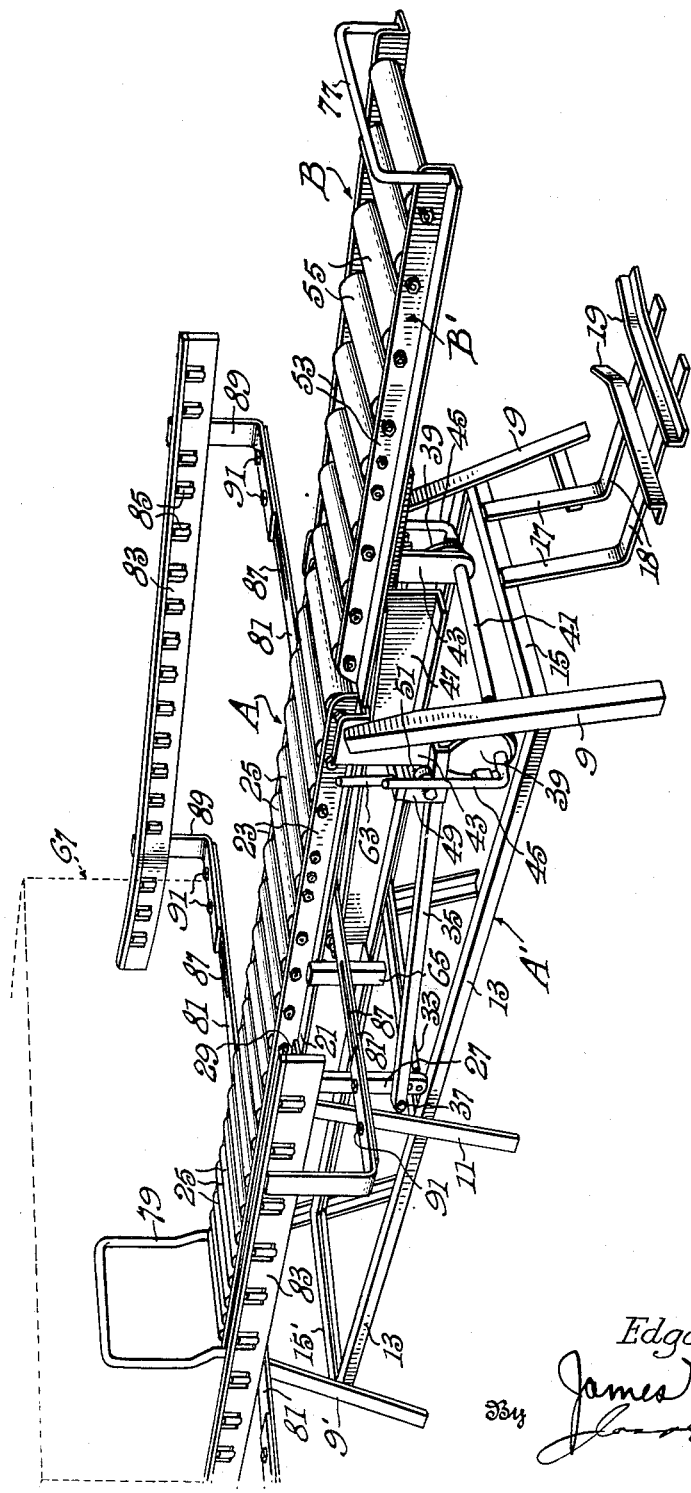
Fig. 3 is a perspective view of the conveyor of Figs. 1 and 2, but with the adjustable section raised into operative position with its conveyor surface flush with the conveyor surface of the adjacent section.
Figure 8:
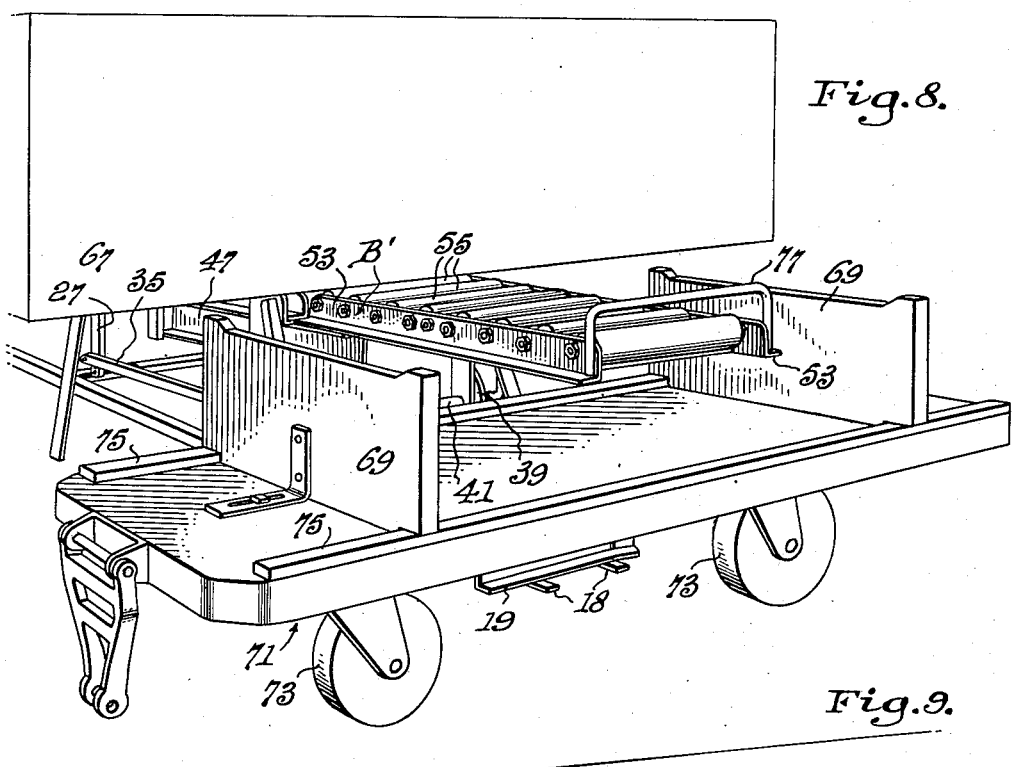
Figure 9:
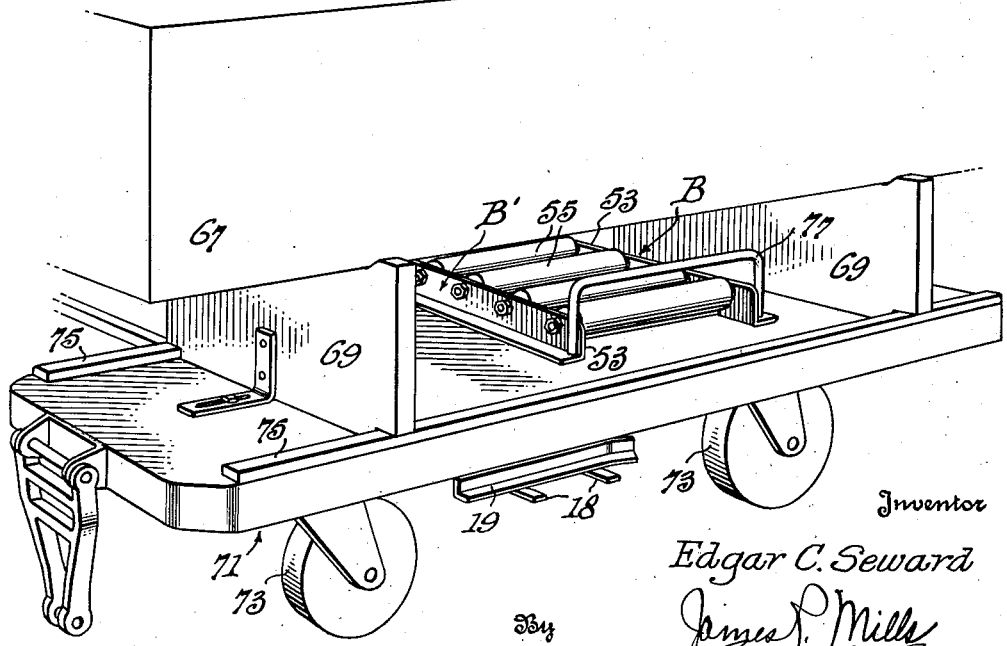

Fig. 6 is a transverse vertical sectional view of the apparatus with the adjustable conveyor section in extended and raised position, the view being taken on the line VI—VI of Fig. 4, looking in the direction of the arrows, the view showing in dotted lines an item of cargo being conveyed to a dock trailer, the item of cargo being centered on the conveyor between lateral guides provided for this purpose;

Fig. 7 is a generally similar view, it being taken along the line VII—VII of Fig. 5, looking in the direction of the arrows, the view indicating the item of cargo delivered to, and mounted on, a dock trailer or similar vehicle, the adjustable conveyor section being lowered and retracted for clearance of the said trailer and item of cargo thereon;

Fig. 8 is a perspective view of the trailer with the adjustable conveyor section raised into operative position, and delivering the item of cargo to the trailer; and Fig. 9 is a perspective view showing the cargo item deposited on the trailer by the conveyor section as in Fig. 6, the adjustable conveyor section being lowered to clear the cargo and ready to be retracted to clear the trailer.

Referring more particularly to the drawings, the improved conveyor as illustrated, comprises a stationary head conveyor section A and a foot conveyor section B that is adjustable both longitudinally and vertically relative to the conveyor section A, so that it may be moved between a nested position beneath the conveyor section A and an extended low position relative to the section A, and then between this low extended position and a raised extended position with its conveying surface of the rollers flush with the rollers of the conveying section A for presenting a continuously uninterrupted conveyor surface throughout the length of the conveyor when the sections are in operative position. In addition to this broad concept, the invention comprises the operating structure for effecting such dual adjustments, and the structural assemblies operatively associated with such adjusting instrumentalities.

For the purpose of illustration, the stationary conveyor section A is shown as including a stationary carrying frame indicated generally as A', whereas the adjustable conveyor section B is mounted on an adjustable frame B' which is slidably adjustable relative to the conveyor frame A', conveyor section B and its frame B' being adjustably mounted on the stationary frame section.

The stationary frame A' comprises corner standards 9 and 9' and intermediate standards 11, all of these standards being interconnected by longitudinally extending bottom angle bars 13 and transverse end angle bars 15 and 15', the angle bar 15 being at the forward end of the conveyor frame A' and has secured to it the depending spaced bracket bars 17 which are bent at substantially right angles to form horizontal sections 18 which carry spaced guides 19 that extend transversely across the sections 18, and which serve a purpose which will be described hereinafter. The stationary conveyor frame is completed by the top longitudinally extending angle beams 21, the upstanding flanges 23 of which serve as bearing mountings for conveyor rollers 25 of the stationary section A.

Vertically disposed links 27 are mounted on angle brackets 29 welded to the horizontal flanges 31 of the top longitudinal extending angle beams 21 of the frame A'. These depending links 27 are mounted adjacent to the intermediate standards 11 of the frames A', and the lower ends of the links 27 are connected by a bar 33 extending transversely across the conveyor frame, these links 27 serving as mountings for longitudinal track channels 35, which are pivotally connected at one end thereof to the arms 27 adjacent to their lower ends, as is indicated at 37. The opposite ends of the track channels 35 rest on lifting cams 39, which enter the channels 35 between these sides, the cams 39 being interconnected by a shaft 41 bearing in the lower ends of depending cheek plates 43, which are welded to the forward ends of the angle beams 21 through the integral interconnecting web 44 of the plates 43. The cams 39 are rotated by an actuating lever 45, lifting of the lever 45 raising the free ends of the track beams 35, and with these the side channels 47 of the adjustable frame B'. These channels 47 are mounted for longitudinal movement on the track angles 35 through brackets 49 which enclose antifriction rollers 51. These means or antifriction supporting means or rollers 51 travel on the track beams 35 and slidingly advance and retract the channels 47 relative to the conveyor section A and frame A', these channels 47 bearing against the underside of the top longitudinal angle beams 21. The channels 47 have welded thereon the angle members 53 of the adjustable conveyor sections, these angle members 53 mounting conveyor rollers 55 of the adjustable conveyor section B'.

It will be apparent from the drawings that the tracks 35 slope downwardly from the cams 39 upon which the free ends of the tracks 35 rest to the pivotal connections 37 between the tracks 35 and the depending bracket links 27, and that adjacent to the rear end of the channels 47 on the upper flange thereof are brackets 57 which form bearings for anti-friction supporting means or rollers 59 that bear continuously against the underside of the horizontal flange 31 of the top angles 23, forming anti-friction rollers for easy adjustment of the forward conveyor section; and they also constitute the fulcrum points for the channels 47 when the section B of the conveyor is raised, as will be apparent from Fig. 4, and also when the section B is lowered and retracted as shown in Fig. 5. The channels 47 always slope downwardly from the rollers 59 when the conveyor section B is in lowered extended position, and upwardly from these rollers 59 when the section B is elevated into operative position, the rollers 59 being at all times in contact with the flanges 31 of the top angles 23, these flanges defining upper tracks for the longitudinal movement of the frame B'. The rearward slope of tracks 35, coupled with the continuous engagement of the rollers 59 with the underside of flanges 31, makes for easy retraction of the conveyor section B, the operation being performed substantially by gravity, forward movement of the conveyor section being effected by a manual pull on handles 63. It will be seen that the conveyor is designed so that when the forward foot section B is raised, the top of rollers 55 of this section come flush with rollers 25, and if there is any tendency for the section B to roll backward when in elevated position, it substantially immediately engages against the front end of the stationary head section A, which stops any such backward movement. When in lowered position, brackets 49 engage links 27 to stop backward movement of the conveyor section B, while in the forward position, the brackets 49 engage against the cheek plates 43 for stopping forward movement of the conveyor section B at the end of its desired travel. Additional, excessive lateral displacement of the conveyor section B is prevented by guide bars 65 welded to, and depending from, the lower flange 31 of the top conveyor angles 21.

The items of cargo, indicated at 67, are deposited on the rear, or head, end of the conveyor and are moved into desired position until the adjustable foot section of the conveyor is extended and raised into operative position following placement of dock trailer or equivalent vehicle 71, in proper load-receiving position by engagement of wheels 73 of the trailer in the space between the guide rails 19 in front of the conveyor. The front end of the conveyor section B projects over the trailer, the cargo 67 being deposited on the supports 69 responsively to lowering the conveyor section B from its raised to its lowered position, as will be apparent from Figs. 8 and 9. Then the retraction of the conveyor section B as described above, clears the conveyor from the trailer 71 and the load 67 is deposited thereon. The supporting members 69 enable clearance of the conveyor, and these supports 69 may be adjusted relative to each other by sliding on slides 75 on the sides of the trailer platform for accommodating cargo items of varying widths. It will be noted from Figs. 8 and 9 that the supports 69 are recessed at their corners for preventing lateral displacement from these slides 75.

It is desirable to provide a stop 77 at the foot of the conveyor for preventing over-riding of the cargo items from the conveyor. Also, there may be provided a head stop 79.

As a further optional provision, transverse straps 81 may be welded to the angles 21, on which are slidably mounted for adjustments towards and away from the conveyor, lateral guide rails 83 for centering the cargo items on the conveyor and for preventing such items from sliding off the sides of the conveyor. These guides 83 extend in a longitudinal direction relative to the conveyor, and for facilitating movement of the cargo items, the rails 83 may be provided with anti-friction rollers 85 rotatably mounted therein, which rollers may be engaged by the cargo items as they pass along the conveyor. As will be seen from the drawings, straps 81 may be slotted as indicated at 87, in which slots are slidably mounted brackets 89 which carry the guide rails 83, the brackets being mounted on the straps 81 by retaining means 91 which ride in the slots 87.

Having thus described my invention, what I claim as new and wish to secure by Letters Patent is:

1. A fast-clearing roller type conveyor comprising a stationary section including a stationary frame and roller conveyor elements mounted on the stationary frame, an adjustable section including an adjustable frame and roller conveyor elements mounted on the adjustable frame, means interconnecting the stationary frame and the adjustable frame, inverted channel track members carried by the stationary frame longitudinally thereof, anti-friction supporting means connected to the adjustable frame engaging an upwardly disposed surface of the inverted channel track members for movement therealong for shifting the adjustable frame and conveyor elements mounted thereon between an extended position projecting beyond the stationary section and a retracted position entirely enclosed in the stationary frame with the conveyor elements on the adjustable frame nested below the conveyor elements on the stationary frame, the said inverted channel track members being pivotally connected to the stationary frame at one end and having free opposite ends, and rotary lifting cams mounted on the stationary frame and bearing interiorly against the inverted channel track members for lifting the adjustable frame vertically with reference to the stationary frame from a low position to an elevated position with the conveyor elements on the adjustable frame substantially flush with the conveyor elements on the stationary frame by presenting a continuously even conveyor surface.

2. A fast-clearing roller type conveyor comprising a stationary section including a stationary frame and roller conveyor elements mounted on the stationary frame, a telescopically adjustable section including an adjustable frame and roller conveyor elements mounted on the adjustable frame, means interconnecting the stationary frame and the adjustable frame, inverted channel track members carried by the stationary frame longitudinally thereof, side channels mounted on the adjustable frame, brackets secured to the side channels, anti-friction supporting means enclosed by said brackets engaging the inverted channel track members for movement therealong for shifting the adjustable frame and conveyor elements mounted thereon between an extended position projecting beyond the stationary section and a retracted position entirely enclosed in the stationary frame with the conveyor elements on the adjustable frame nested below the conveyor elements on the stationary frame and entirely beneath the conveyor elements of the stationary frame, the said inverted channel track members being pivotally connected to the stationary frame at one end and having free opposite ends, and rotary lifting cams mounted on the stationary frame and bearing interiorly against the inverted channel track members for lifting the adjustable frame vertically with reference to the stationary frame from a low position to an elevated position with the conveyor elements on the adjustable frame substantially flush with the conveyor elements on the stationary frame for presenting a continuously even conveyor surface.

3. A fast-clearing roller type conveyor comprising a stationary section including a stationary frame and roller conveyor elements mounted on the stationary frame, an adjustable section including an adjustable frame and roller conveyor elements mounted on the adjustable frame, means interconnecting the stationary frame and the adjustable frame, track members carried by the stationary frame longitudinally thereof, a U-shaped member mounted on the adjustable frame and having its closed end extending longitudinally therefrom, brackets secured to the U-shaped member near the open end thereof, anti-friction supporting means enclosed by said brackets engaging the track members for movement therealong, additional anti-friction supporting means secured to the U-shaped member near the closed end thereof continuously bearing against the stationary frame throughout horizontal shifting movements of the adjustable frame, the anti-friction supporting means being adapted to shift the adjustable frame and conveyor elements mounted thereon between an extended position projecting beyond the stationary section and a retracted position entirely enclosed in the stationary frame with the conveyor elements on the adjustable frame nested below the conveyor elements on the stationary frame, the said track members being pivotally connected to the stationary frame at one end and having free opposite ends, and rotary lifting cams mounted on the stationary frame and bearing against the free ends of the track members for lifting the adjustable frame vertically with reference to the stationary frame from a low position to an elevated position with the conveyor elements on the adjustable frame substantially flush with the conveyor elements on the stationary frame for presenting a continuously even conveyor surface.

4. A fast-clearing roller type conveyor comprising a stationary section including a stationary frame and roller conveyor elements mounted on the stationary frame, an adjustable section including an adjustable frame and roller conveyor elements mounted on the adjustable frame, means interconnecting the stationary frame and the adjustable frame, inverted channel track members carried on the stationary frame longitudinally thereof, a U-shaped member mounted on the adjustable frame and having its closed end extending upward therefrom to continuously engage the stationary frame, brackets secured to the U-shaped members near the open end thereof, anti-friction supporting means enclosed by said brackets engaging the inverted channel track members for movement therealong for shifting the adjustable frame and conveyor elements between an extended position projecting beyond the stationary section and a retracted position entirely enclosed in the stationary frame with the conveyor elements on the adjustable frame nested below the conveyor elements on the stationary frame, means mounted on each of said brackets for manually grasping the adjustable section for facilitating longitudinal movement thereof, the said inverted channel track members being pivotally connected to the stationary frame at one end and having free opposite ends, and rotary lifting cams mounted on the stationary frame and bearing against the track members for lifting the adjustable frame vertically with reference to the stationary frame from a low position to an elevated position with the conveyor elements on the adjustable frame substantially flush with the conveyor elements on the stationary frame for presenting a continuously even conveyor surface.

5. A fast-clearing roller type conveyor comprising a stationary section including a stationary frame and roller conveyor elements mounted on the stationary frame, an adjustable section including an adjustable frame and roller conveyor elements mounted on the adjustable frame, the adjustable frame having a connected end and a free end, means interconnecting the stationary frame and the adjustable frame adjacent to the connected end of the latter, the stationary frame including inverted channel track members disposed laterally and longitudinally thereof and below the adjustable frame, the track members being pivotally connected to the stationary frame at one end and having corresponding free ends on opposite sides of the frame, the stationary frame also including rigidly secured bottom side bars positioned below the said track members, rotary lifting cams mounted on opposite sides of the stationary frame adjacent one end thereof and intermediate the said track members and the said rigid bottom side bars and bearing against the free ends of the inverted channel members and the rigidly mounted bottom side bars for lifting the adjustable frame substantially vertically with reference to the stationary frame, said inverted channel track members sloping rearwardly from the free ends thereof, a U-shaped member comprising a pair of spaced parallel side channel members and an end member mounted on adjacent ends of the side channel members mounted on the adjustable frame and having its closed end extending upwardly therefrom to continuously engage the stationary frame, brackets secured to the U-shaped members near the open end thereof, anti-friction supporting means secured to said brackets engaging the inverted channel track members for movement therealong for shifting the adjustable frame and conveyor elements between an extending position projecting beyond the stationary section and a retracted position entirely enclosed in the stationary frame with the conveyor elements on the adjustable frame nested below the conveyor elements on the stationary frame, means mounted on each of said brackets for manually grasping the adjustable section for facilitating longitudinal movement thereof, said rotary lifting cams having continuously smoothly concavely curved operative surfaces uniformly converging to an apex, a shaft extending transversely of the stationary frame connecting the cams adjacent to the free end of the said frame and offset from the center of the cams towards the said free end, and operating handle means mounted on the cams in axial registry with the connecting shaft, the cams having an operating surface continually engaging the inverted channel track members with the said apexes of the cams and the handle means shiftable between a substantially vertical operative position relative to the inverted channel track members for lifting the adjustable conveyor section and a substantially horizontal inoperative position when the adjustable conveyor section is lowered for retraction.

EDGAR CARL SEWARD.

REFERENCES CITED

The following references are of record in the file of this patent:

UNITED STATES PATENTS

| Number | Name | Date |
|---|---|---|
| 757,544 | Dobrodenka et al. | Apr. 19, 1904 |
| 935,669 | Logan | Oct. 5, 1909 |
| 1,073,128 | Hofmayr | Sept. 16, 1913 |
| 1,287,170 | Younkman | Dec. 10, 1918 |
| 1,483,971 | Grossman | Feb. 19, 1924 |
| 1,772,629 | Goldberg | Aug. 12, 1930 |
| 1,884,191 | Perloff | Oct. 25, 1932 |
| 1,942,387 | Wolters | Jan. 2, 1934 |
| 1,959,735 | Phillips | May 22, 1934 |
| 1,985,620 | Raphael | Dec. 25, 1934 |
| 2,306,031 | Anderson et al. | Dec. 22, 1942 |